United States Patent [19]

Bissot

[11] 4,048,096

[45] Sept. 13, 1977

[54] SURFACE IMPREGNATED CATALYST

[75] Inventor: Thomas Charles Bissot, Newark, Del.

[73] Assignee: E. I. Du Pont de Nemours and Company, Wilmington, Del.

[21] Appl. No.: 675,766

[22] Filed: Apr. 12, 1976

[51] Int. Cl.² ............................................ B01J 31/04
[52] U.S. Cl. ..................................... 252/430; 560/231
[58] Field of Search ......................................... 252/430

[56] References Cited

U.S. PATENT DOCUMENTS 3,743,607  7/1973  Sennewald et al. ................. 252/430
3,775,342  11/1973  Kronig et al. ......................... 252/430
3,969,271  7/1976  Lester ................................... 252/430

OTHER PUBLICATIONS 1,103,125 02001968 UK 252 430

*Primary Examiner*—Patrick P. Garvin

[57] ABSTRACT

A surface impregnated catalyst consisting essentially of a catalyst support, a palladium-gold alloy distributed in a surface layer of the catalyst support extending less than about 0.5 millimeter from the surface, and alkali metal acetate are provided. The catalyst has substantially higher specific activity than prior art catalysts used for the production of vinyl acetate.

19 Claims, No Drawings

SURFACE IMPREGNATED CATALYST

BACKGROUND OF THE INVENTION

1. Field of the Invention

This invention relates to catalysts for the preparation of vinyl esters and more particularly it relates to an improved palladium-gold alloy catalyst.

2. Description of the Prior Art

U.S. Pat. No. 3,190,912 discloses the preparation of catalyst for preparing unsaturated organic esters wherein the catalyst consists of unsupported or supported metals of the platinum or palladium group or oxides or salts thereof, either organic or inorganic. Supported catalyst is prepared by dissolving the metal salt or salts in, for example, water, adding the support and evaporating the solvent. The noble metal is distributed uniformly throughout the support. The activity of the catalyst can be promoted by the addition of a metal halide promoter.

U.S. Pat. No. 3,275,680 discloses a palladium catalyst on aluminum oxide support which when promoted with alkali acetate has been found suitable for the production of organic acetates, especially vinyl acetate. The palladium catalyst is deposited throughout the catalyst support. There is no specific disclosure in the patent of combinations of two noble metals or of the use of alloys. The space-time-yield is approximately 50 grams of vinyl acetate per hour per liter of catalyst at about 150° C. This corresponds to a specific activity of about 1.8 grams of vinyl acetate per gram palladium per hour (4% palladium on $Al_1O_3$ support of 700 grams per liter density). The catalyst is prepared by impregnating the support with an aqueous solution of the noble metal salt and precipitating the noble metal on the support by reduction.

U.S. Pat. No. 3,743,607 discloses a catalyst containing palladium, gold and an alkali metal acetate. Reproducing the examples of this patent it can be determined that the palladium and gold are distributed throughout the catalyst support. The catalyst produced approximately 50 to 150 grams vinyl acetate per hour per liter of catalyst at 170° C. Based upon 1.1% palladium and gold on an about 600 grams per liter density support this corresponds to a specific activity of about 7.6 to 22.7 grams of vinyl acetate per gram precious metal per hour (at 170° C). The catalyst is prepared by impregnating a carrier such as silicic acid, aluminum oxide, or silicate, aluminum phosphate, etc. with an aqueous solution of a palladium salt and of a gold salt and evaporating the resulting mixture to dryness. The palladium and gold salts are then reduced to their metallic state by a reducing agent. The catalyst is then washed with water, impregnated with a solution of sodium acetate and upon drying is ready for use.

British Pat. No. 1,333,449 describes a palladium-gold catalyst suitable for the preparation of vinyl acetate. It can be established that the process of this patent results in the palladium salts being deposited throughout the catalyst support. The catalyst is prepared by impregnating the catalyst support with a solution of palladium acetate, barium aceto-aurate and potassium acetate in acetic acid and subsequently drying it. The catalyst is disclosed to be a palladium salt and other additives, such as gold, gold salts, alkaline earth metal salts and alkaline metal salts supported on a carrier. The space-time-yield is about 240 grams of vinyl acetate per hour per liter of catalyst at a temperature of 180° C., which calculates to about 31.5 grams of vinyl acetate per gram precious metal per hour.

U.S. Pat. No. 3,775,342 discloses a vinyl acetate catalyst. Reproducing the examples of this patent it can be determined that an interior band of palladium-gold alloy is deposited on the catalyst support. The catalyst yielded from about 235 grams vinyl acetate per liter of catalyst per hour at 140° C. up to about 452 grams of vinyl acetate per hour per liter of catalyst at 176° C. This corresponds to a specific activity of 49 and 94 grams of vinyl acetate per gram precious metal per hour at 140° C. and 176° C., respectively. The catalyst is disclosed to be prepared by treating the catalyst support simultaneously or successively, with or without intermediate drying, with a solution of palladium and gold salts and a solution which contains compounds that are able to react on the catalyst support with the palladium-gold salts to form water insoluble palladium and gold compounds and then transforming the water insoluble palladium and gold compounds into the noble metals by treatment with reducing agents, and removing the water soluble compounds by washing. It is recommended to employ an alkali metal carboxylate, e.g., alkali metal acetate, on the catalyst such that after drying the catalyst contains from 1 to 30 percent by weight alkali metal carboxylate. In all of the examples, in which the catalyst support was treated successively with the solution of palladium and gold compounds and the precipitating solution the catalyst was dried between these successive treatments.

Published Japanese Patent Application No. 48-10135/1973 describes a process for preparing surface impregnated supported vinyl acetate catalyst. In a preliminary step a small amount of reduced metal (such as gold) is deposited throughout the porous support. This is followed by impregnation of the required amount of palladium catalyst which then is deposited in a surface layer around the preformed metal particles. The palladium catalyst is deposited in a surface layer which has a thickness of about 15% or less of the particle radius. The use of alkali metal acetate salts as a cocatalyst is recommended. This catalyst is disclosed to yield about 170 grams of vinyl acetate per liter of catalyst per hour at 120° C. and up to about 295 grams of vinyl acetate per hour per liter of catalyst at 130° C. These correspond to specific activities of 11 and 19 grams of vinyl acetate per gram of precious metal per hour at 120° C. and 130° C., respectively.

British Patent Specification 1,283,737 discloses a method of preparing a supported metal catalyst by contacting the support with a solution of a compound of a metal such as platinum, palladium, etc. and converting the deposited compound to the metallic state, the porous catalyst support having been impregnated with an alkaline solution and saturated with from 25 to 90% of water or an alcohol. The degree of penetration of metal into the catalyst support pellet is disclosed to be up to 50% of the pellet radius. The use of a minor amount of an activator, such as sodium and potassium acetate, is recommended. Catalysts prepared in this fashion were disclosed to yield up to 18 grams of vinyl acetate per hour per gram of palladium at 140° C. Data contained in the examples indicates that for penetration levels of up to 37 and 25%, respectively, the amount of vinyl acetate produced in grams per hour per gram of palladium increases with increasing penetration.

Published Patent Application No. 73713/74 discloses a process for the preparation of catalyst suitable for the production of vinyl acetate by employing palladium and gold deposited on a porous catalyst support consisting essentially of silica or alumina, which support has a particle radius of 1.0 and 5.0 millimeters and a pore volume of 0.1 to 2.0 ml./g. At least 90% of each of the palladium and gold is disclosed to be present in a surface layer which extends less than 30% of the particle radius from the surface and wherein the percentage of gold is 5 to 60% by weight of the sum of palladium and gold present. The catalyst contains 0.3 to 3.0% of palladium and 0.0157 to 1.8% of gold, both based on the weight of the support. Such catalyst are disclosed to possess improved ability to produce vinyl acetate. Supported catalyst having the above improved properties is disclosed to be prepared by preliminary depositing a very small amount of a reduced metal, such as palladium and/or gold, on the porous carrier, for example, by impregnating the carrier with a salt solution of the metal to be deposited, drying the catalyst support and reducing the metallic salt to metal. This is followed by depositing the necessary amount of palladium and gold to be employed in the catalyst which will then adhere to the surface layer of the catalyst support and is stated to improve catalytic efficiency as compared to conventional catalysts. Production of vinyl acetate at 110° C. was disclosed to be as high as 158 grams per hour per liter of catalyst and at 120° C. as high as 192 grams of vinyl acetate per hour per liter of catalyt. These correspond to specific activities of 6 grams of vinyl acetate per gram of precious metal per hour at 110° C. and 7.4 grams of vinyl acetate per gram of precious metal per hour at 120° C.

U.S. Pat. No. 3,939,199 discloses the use of a catalyst wherein palladium is deposited on a catalyst support which has a pore volume of from 0.4 to 1.2 ml./g. and wherein less than 10% of the total pore volume is attributable to micropores having a diameter of less than 30 Angstrom. The usual inert substances such as silicic acid, silicates, aluminum silicates, titanium oxide, zirconium oxide, and various glasses are disclosed as the suitable support materials. For the preparation of vinyl acetate from ethylene and oxygen, the catalyst support is impregnated with a solution of palladium acetate, cadmium acetate and potassium acetate in acetic acid with subsequent drying. The catalyst yielded 305 grams of vinyl acetate per hour per liter of catalyst at 180° C. which corresponds to a specific activity of 60 grams of vinyl acetate per gram of palladium per hour at 180° C.

SUMMARY OF THE INVENTION

According to the present invention there is provided a catalyst having a specific activity of at least about 83 grams of vinyl acetate per gram of precious metal per hour measured at 150° C. consisting essentially of (1) a catalyst support having a particle diameter of from about 3 to about 7 mm. and a pore volume of from about 0.2 to about 1.5 ml./g., a 10% by weight water suspension of the catalyst support having a pH of from about 3.0 to about 9.0; (2) a palladium-gold alloy distributed in a surface layer of the catalyst support, the surface layer extending less than about 0.5 mm from the surface of the support, the palladium in the alloy being present in an amount of from about 1.5 to about 5.0 grams per liter of catalyst, and the gold being present in an amount of from about 0.5 to about 2.25 grams per liter of catalyst, and (3) from about 5 to about 60 grams per liter of catalyst of alkali metal acetate.

Further provided according to the present invention is a process for preparing a catalyst comprising palladium and gold deposited on a catalyst support having a particle diameter of from about 3 to about 7 mm. and a pore volume of from about 0.2 to about 1.5 ml./g., a 10% by weight water suspension of the support having a pH of from about 3.0 to about 9.0, by (1) impregnating the catalyst support with aqueous solution of water-soluble palladium and gold compounds, (2) precipitating water-insoluble palladium and gold compounds on the catalyst support by contacting the impregnated catalyst support with a solution of compounds capable of reacting with the water-soluble palladium and gold compounds to form water-insoluble palladium and gold compounds, (3) converting the water-insoluble palladium and gold compounds into palladium and gold metal by treatment with a reducing agent, (4) washing the catalyst with water, (5) contacting the catalyst with alkali metal acetate and (6 drying the catalyst, the improvement where the palladium and gold is distributed as an alloy in a surface layer of the catalyst support, the surface layer extending less than about 0.5 millimeter from the surface of the support, the impregnating step being carried out with an aqueous solution of palladium and gold compounds, the total volume of which is from about 95 to about 100% of the absorptive capacity of the catalyst support and the precipitating step being carried out by soaking the wet catalyst support with a solution of an alkali metal silicate, the amount of alkali silicate being such that after the alkali metal silicate solution has been in contact with the catalyst support for about 12 to 24 hours the pH of said solution is from about 6.5 to about 9.5.

Still further provided according to the present invention is a process for preparing vinyl acetate by reacting ethylene, oxygen and acetic acid in the vapor phase at elevated temperature and pressure in the presence of the improved catalyst of the present invention.

DETAILED DESCRIPTION OF THE INVENTION

An improved catalyst for preparing vinyl esters, e.g., vinyl acetate (VAc), by the vapor phase reaction of ethylene, oxygen and a carboxylic acid has been discovered. The improved catalyst consists essentially of a palladium-gold alloy finely distributed in the surface layer of an inert catalyst support. The process for preparing this surface impregnating catalyst is carried out by precipitating the palladium and gold as hydroxides at the surface of the support using an alkali metal silicate as the precipitant. The precious metal hydroxides thus deposited are subsequently reduced to the metal.

The improved catalyst of the present invention has a substantially higher activity (space-time-yield or STY expressed in grams) producing at 150° C. approximately 500 grams of vinyl acetate per liter of catalyst per hour under conditions where catalysts prepared according to prior art processes and having the same quantity of palladium and gold would give 300 STY. Expressed in terms of specific activity, the grams of vinyl acetate produced per gram of precious metal per hour, which is a more accurate indication of catalyst efficiency, these values correspond to about 104 for the present catalyst and about 62 for the prior art catalyst. Since palladium is the active catalyst metal and gold is a catalyst promoter, specific activity could also be based on the amount of palladium present. This would result in even higher specific activity values for the catalyst of the present invention. However, it was felt that from an economic point of view basing the specific activity on the combined palladium and gold metal present would result in a more realistic basis of comparison. Alternatively, one can elect to operate the present improved catalyst at the same specific activity level as the prior art catalysts by operation at a lower temperature whereby a 1-2% improvement in ethylene yield can be obtained.

In the preparation of the improved catalyst of the present invention, a suitable catalyst support is first impregnated with an aqueous solution containing water-soluble palladium and gold compounds. Separate solutions of palladium and gold compounds could also be used successively, but it is less convenient to proceed in that fashion. Palladium (II) chloride, sodium palladium (II) chloride, palladium (II) nitrate or palladium (II) sulfate are examples of suitable water-soluble palladium compounds, whereas auric (III) chloride or tetrachloroauric (III) acid can be used as the water-soluble gold compounds. The generally available tetrachloroauric (III) acid and sodium palladium (II) chloride are preferred because of their good water solubility. The quantity of these compounds employed is such as to provide 1.5 to 5.0 grams of palladium and 0.5 to 2.25 grams of gold per liter of finished catalyst. Accordingly, the amount of gold present in the catalyst will be from about 9 to about 60% of the combined amount of palladium and gold. The preferred range for palladium is from 1.65 to 3.3 g./l. and for gold from 0.75 to 1.5 g./l. The volume of solution used for impregnating the support with the precious metals is critical. For effective deposition, the volume of the solution should be from 95 to 100% of the absorptive capacity of the catalyst support and preferably it should be 98-99%.

After impregnation with the precious metal solution, the wet support is covered with a solution of an alkali metal silicate solution. For best results it is recommended that the alkali metal silicate solution be added as rapidly as practical. The alkali metal silicate can be derived from any of the alkali metals, however, for cost and availability reasons, the sodium salt is preferred. The composition of this solution can vary from sodium orthosilicate ($Na_4SiO_4$), through sodium metasilicate ($Na_2SiO_3$), sodium disilicate ($Na_2Si_2O_5$) to commercial waterglass solutions of indefinite compositions $Na_2O \cdot x SiO_2 (x = 3-5)$. The preferred source of sodium silicate is crystalline hydrated sodium metasilicate, $Na_2SiO_3 \cdot 9H_2O$, because it is available in a reproducible composition, and in high purity.

The quantity of the alkali silicate used to prepare the catalyst is extremely critical. The quantity must be such that after the alkali silicate solution has equilibrated with the precious metal impregnated catalyst support for a period of 12 to 24 hours, the pH of the solution covering the support will be from about 6.5 to about 9.5 and preferably from about 7.5 to 8.0. The exact quantity required to attain this pH is dependent on the type and quantity of precious metal salts used, the type of catalyst support and the type of alkali silicate used. It is best determined empirically on small scale batches until the exact quantity of alkali silicate required is determined.

The wet impregnated support should be soaked in the alkali silicate solution for a time sufficient to allow precipitation of the precious metals in the surface layer to the desired extent. To assure precipitation of substantially all of the precious metal the preferred contact time is at least 12 hours. Longer periods of time are not harmful and equilibration times up to three days have given catalysts of high activity.

After the equilibration period, the precious metal hydroxides which are deposited in the surface layer of the catalyst support are reduced to the metal. This is usually accomplished in solution by adding a reducing agent such as hydrazine or formaldehyde. Alternately, the catalyst can be dried and the reduction accomplished in the gas phase by passing hydrogen or ethylene gas over the catalyst at 100° C.–300° C.

The remaining steps in the catalyst preparation are the same as in the published patent art. These steps include washing the catalyst to remove chloride ion (or other anion), drying, impregnation with an alkali metal acetate and final drying.

If the above conditions are followed, a catalyst is obtained in which the palladium and gold are deposited as an alloy in a surface layer which extends less than 0.5 mm from the surface and preferably less than 0.2 mm from the surface. The palladium and gold are deposited as small distinct islands, crystalline particles in the catalyst support matrix. Generally these crystallites are composed of palladium-gold alloy of substantially the same ratio as the ratio of palladium to gold in the aqueous solution of palladium and gold salts. The amount of alkali metal acetate present in the catalyst is from about 5 to about 60 grams per liter of catalyst. Preferably, the amount is from about 25 to about 35 grams per liter of catalyst.

This technique can be used to prepare surface impregnated catalyst on a variety of catalyst supports provided the support is not too acidic or basic. Suitable supports have a particle diameter of from about 3 to about 7 millimeters. The pH of a 10% by weight water suspension of the support should not be less than about 3.0 nor greater than about 9.0. This is measured by grinding a sample of the support to a fine powder, suspending 5 grams in 50 grams of distilled water and stirring for 15 minutes. The pH is determined with a glass electrode. Pore volume of the catalyst support should be from about 0.2 to about 1.5, preferably from about 0.5 to about 1.1 ml. per gram of support. Preferably the catalyst support should have an internal surface area according to BET of from about 10 to about 800 m.$^2$/gram. The most preferred supports are silica base supports whether of natural or synthetic origin containing at least about 90% $SiO_2$ and having an internal surface area of from about 40 to about 400 m.$^2$/gram.

The catalyst of this invention also gives superior results in other reactions which involve an olefin, oxygen and a carboxylic acid. Examples are the reaction of ethylene, $O_2$ and propionic acid to give vinyl propionate, $O_2$ and acetic acid to give allyl acetate.

The following examples are given for the purpose of illustrating the invention. All parts and percentages are by weight unless otherwise specified.

EXAMPLE I

A surface impregnated catalyst was prepared in the following manner: 1.2 liters of a silica support in the form of 5 mm diameter spheres, having a density of 540 grams per liter and a pore volume of 0.68 ml per gram of support and having a pH of 4.0 in a 10% by weight water suspension was impregnated with 440 ml of an aqueous solution of $Na_2PdCl_4$ and $HAuCl_4$ containing 3.96 grams palladium and 1.8 grams of gold (99.8% of absorptive capacity of the support). A container holding the mixture was rotated mechanically until the solution was completely absorbed by the silica spheres. Then 500 ml of a solution containing 25.2 grams of sodium metasilicate ($Na_2SiO_3.9H_2O$) was added to completely cover the wet impregnated support. This was allowed to stand for 12 hours at room temperature, after which time the pH of liquid surrounding the spheres was found to be 7.8. At this time 25 ml of 85% hydrazine hydrate was added, mixed gently and allowed to stand for 4 hours at room temperature in order to reduce the palladium and gold. The catalyst was then washed with distilled water three times by decantation followed by a continuous wash for 16 hours at the rate of 1-2 liters of distilled water per hour. The wash water was free of chlorides after this period as checked by the absence of a precipitate when tested with silver nitrate solution.

The wash water was retained and the precious metal recovered. Three percent of the original precious metals were recovered from the washing operation.

The catalyst was then dried at 110° C. for 4 hours, cooled, impregnated with a solution containing 36 grams of potassium acetate (corresponding to 30 grams of potassium acetate per liter of catalyst) and redried.

The finished catalyst was analyzed and found to contain 3.32 g./l. of palladium and 1.39 g./l. of gold versus 3.3 g./l. of palladium and 1.5 g./l. of gold in the starting materials. This represents 100 percent palladium deposition and 92.7 percent gold deposition.

Examination of cross-sections of this catalyst by low powered microscope and by x-ray microprobe showed that the palladium-gold was all deposited in a surface layer extending not more than 0.2 mm below the outer surface of the support.

The catalyst was then tested in a reaction tube having a length of 2 meters and an inside diameter of 25 mm to which was fed a gaseous mixture of 70 mols of ethylene, 5.25 mols of oxygen and 17.1 mols of acetic acid per hour. With the jacket of the reactor at 150° C. and the pressure controlled at 120 psig, a space-timeyield of 560 grams of vinyl acetate per liter of catalyst per hour was produced. This corresponds to a specific activity of 119 grams of vinyl acetate per gram of precious metal per hour. The ethylene selectivity to vinyl acetate was 93%, the remaining 7% being converted into carbon dioxide. At higher temperatures, STY's of greater than 700 could be obtained but with a decrease in the ethylene selectivity.

EXAMPLE II

This example illustrates the use of a lower concentration of palladium and gold precipitated in the surface layer of the support. The procedure of Example I was followed except that the support was impregnated with 437 ml of a precious metal solution containing 1.98 grams of palladium and 0.9 gram of gold. The wet impregnated spheres were covered with 500 ml of a solution containing 17.3 grams of sodium metasilicate ($Na_2SiO_3.9H_2O$). After standing for 17 hours the pH was 7.55. The preparation was completed as in Example I and the final catalyst contained 2.29 grams/liter of palladium and gold. In the test reactor this catalyst produced vinyl acetate at a rate of 275 grams of vinyl acetate per liter of catalyst per hour at a reactor jacket temperature of 150° C. This is equivalent to a specific activity of 120 grams of vinyl acetate per gram of precious metal per hour.

EXAMPLE III

This example illustrates the use of a higher concentration of palladium and gold precipitated in the surface layer of the support. The procedure of Example I was followed except that the support was impregnated with 440 ml of a precious metal solution containing 5.94 grams of palladium and 2.70 grams of gold. The impregnated spheres were covered with 500 ml of a solution containing 33.1 grams of sodium metasilicate ($Na_2SiO_3.9H_2O$). After standing for 64 hours the pH was 6.8. The preparation was completed as in Example I and the final catalyst contained 5.06 grams/liter of palladium and 2.10 grams/liter of gold. In the test reactor this catalyst produced 610 grams of vinyl acetate per hour per liter of catalyst at a reactor jacket temperature of 150° C. This is equivalent to a specific activity of 85.2 grams of vinyl acetate/gram of precious metal/hour.

The following comparative example shows the inferior result obtained in the preparation of the catalyst by the prior art process.

COMPARATIVE EXAMPLE

A catalyst was prepared using the same type and amount of support and precious metal solution as in Example I. After impregnation of the support with the precious metal solution, it was dried and then treated with 437 ml of a solution containing 7.09 grams of NaOH. This quantity of solution was completely absorbed by the porous support. This procedure therefore corresponds very closely to Example I of U.S. Pat. No. 3,775,342. The aging, hydrazine reduction, washing and promotion with potassium acetate were completed as in Example I. The completed catalyst contained 4.71 grams/liter of precious metals representing 98.1% deposition on the support; the balance being recoverable from the wash water.

Examination of the completed catalyst showed that the palladium and gold was deposited in a narrow interior band of approximately 0.1 to 0.2 mm thickness. The location of this band was approximately 0.5 mm below the surface or at a distance of approximately 20% of the particle radius from the exterior surface. This catalyst was tested under the conditions of Example I and found to produce 254 grams of vinyl acetate per hour at a jacket temperature of 150° C. This corresponds to a specific activity of 53 grams of vinyl acetate per gram of precious metal per hour at a jacket temperature of 150° C. The ethylene selectivity averaged 93.1% at this temperature.

The following two examples illustrate the use of the present invention on an alternate support.

EXAMPLE IV

A synthetic silica support was used to prepare a surface impregnated catalyst. This support was a 99%+ pure silica in the form of oblate spheroids ranging in diameter from 4.0 to 5.66 mm, having a density of 420 gramsliter, a pore volume of 1.1 ml per gram of support and a pH of 6.7 in a 10% by weight water suspension. The BET surface area was 350 m.²/gram. A quantity of 1.2 liters was impregnated with 542 ml of an aqueous solution of $Na_2PdCl_4$ and $HAuCl_4$ containing 3.96 grams of palladium and 1.8 grams of gold (97.8% of absorptive capacity of the support). After impregnation, it was treated without drying with a solution of 50 grams of sodium metasilicate in 500 ml of solution as in Example I. This was sufficient to cover all of the catalyst beads.

The pH after equilibration for 20 hours was 8.7. The preparation of the catalyst was completed as in Example I and examination of the cross-section of the catalyst showed the palladium and gold to be deposited in a surface layer 0.1–0.2 mm in thickness. The catalyst contained a total of 4.64 g/l of palladium and gold. When tested under the conditions of Example I it produced 560 grams of vinyl acetate per liter of catalyst per hour at a jacket temperature of 150° C. This corresponds to a specific activity of 121 grams of vinyl acetate per gram of precious metal per hour. The ethylene selectivity was 94.5% at this temperature.

EXAMPLE V

A silica support composed of kieselguhr bonded with colloidal silica in the form of ⅛ inch cylindrical extrudate was also tested. This support had a density of 576 grams per liter, a pore volume of 0.508 ml per gram, an internal surface area by BET of 60 m.²/gram and a pH of 6.15 in a 10% by weight water suspension. A volume of 0.88 liter of this support was impregnated with 254 ml of an aqueous solution of $Na_2PdCl_4$ and $HAuCl_4$ containing 2.9 grams of palladium and 1.32 grams of gold (98.6% of absorptive capacity of the support). After impregnation it was treated without drying with 375 ml of an aqueous solution containing 18.3 grams of $Na_2SiO_3.9H_2O$. This was sufficient to cover all of the catalyst support. The pH after equilibration for 22 hours was 8.2. The preparation of the catalyst was completed as in Example I and examination of the cross-section of the catalyst showed the palladium and gold to be deposited in a surface layer 0.1–0.2 mm in thickness. The catalyst contained 2.91 g/l of palladium, 1.28 g/l of gold and 30 g/l of potassium acetate. When tested under the conditions of Example I, it produced 488 grams of vinyl acetate per liter of catalyst per hour at a jacket temperature of 150° C. This corresponds to a specific activity of 116 grams of vinyl acetate per gram of precious metal per hour. The ethylene selectivity was 91.8.

EXAMPLE VI

The following example shows the higher activity of the surface impregnated catalyst even after a long period of use. A 5 liter batch of surface impregnated catalyst was prepared according to Example I and was compared to a catalyst having an interior band of palladium-gold which latter was prepared by a process similar to that of the Control Example. The activity and selectivity of both fresh catalysts were tested. These catalysts were then placed side-by-side in a vinyl acetate synthesis reactor and operated under identical temperature and feed conditions for a period of 3000 hours. They were then removed and the activities and selectivity of both were again measured and compared. The results, as shown in Table 1 below, show that higher activity is obtained with the surface impregnated catalyst even after a long period of operation.

I claim:

1. In the process of preparing a catalyst comprising palladium and gold deposited on a catalyst support having a particle diameter of from about 3 to about 7 mm, and a pore volume of from about 0.2 to about 1.5 ml/g, a 10% by weight water suspension of said support having a pH of from about 3.0 to about 9.0, by
   1. impregnating the catalyst support with aqueous solution of water-soluble palladium and gold compounds,
   2. precipitating water-insoluble palladium and gold compounds on the catalyst support by contacting the impregnated catalyst support with a solution of compounds capable of reacting with the water-soluble palladium and gold compounds to form water-insoluble palladium and gold compounds,
   3. converting the water-insoluble palladium and gold compounds into palladium and gold metal by treatment with a reducing agent,
   4. washing the catalyst with water,
   5. contacting the catalyst with alkali metal acetate, and
   6. drying the catalyst, the improvement where the palladium and gold is distributed as an alloy in a surface layer of the catalyst support, said surface layer extending less than about 0.5 mm from the surface of said support, the palladium in said alloy being present in an amount of from about 1.5 to about 5.0 grams per liter of catalyst, the gold being present in an amount of from about 0.5 to about 2.25 grams per liter of catalyst, and the alkali metal acetate being present in an amount of from about 5 to about 60 grams per liter of catalyst, said impregnating step being carried out with an aqueous solution of palladium and gold compounds, the total volume of which is from about 95% to about 100% of the absorptive capacity of the catalyst support and said precipitating step being carried out by soaking the wet catalyst support with a solution of an alkali metal silicate, the amount of alkali silicate being such that after the alkali metal silicate solution has been in contact with the catalyst support for about 12 to 24 hours the pH of said solution is from about 6.5 to about 9.5.

2. The process of claim 1 wherein the catalyst support has an internal surface area of from about 10 to about 800 square meters per gram.

3. The process of claim 2 wherein the catalyst support is silica containing at least about 90% by weight $SiO_2$ and having an internal surface area of from about 40 to about 400 square meters per gram.

4. The process of claim 3 wherein the catalyst support has a pore volume of from about 0.5 to about 1.1 ml/g.

5. The process of claim 4 wherein the alkali metal silicate is sodium silicate.

6. The process of claim 5 wherein the sodium silicate is selected from the group consisting of sodium orthosil-

TABLE 1

| | | Surface Impregnated[1] (S.I.) | | | Interior Band[2] (I.B.) | | | |
|---|---|---|---|---|---|---|---|---|
| Catalyst Age | Jacket Temp., ° C. | STY g./l. hr. | Specific Activity, g./g. hr. | SEL, % | STY g./l. hr. | Specific Activity, g./g. hr. | SEL, % | STY Ratio S.I./I.B. |
| fresh | 147 | 505 | 107 | 92–93 | 300 | 67 | 91.9 | 1.68 |
| 3000 hour | 165 | 331 | 70 | 90.2 | 315 | 70 | 89.5 | 1.05 |

[1]Assay: Palladium content - 3.32 g./l., Gold content - 1.39 g./l.
[2]The actual assay of the catalyst used in this Example is not available. The average value of four other batches of the same catalyst is 3.06 g./l. palladium and 1.42 g./l. gold.

icate, sodium metasilicate, sodium disilicate and waterglass.

7. The process of claim 6 wherein the wet catalyst support is soaked with the sodium silicate solution for at least about 12 hours.

8. The process of claim 7 wherein the sodium silicate is crystalline hydrated metasilicate.

9. The process of claim 8 wherein the total volume of palladium and gold solution is from about 98% to about 99% of the absorptive capacity of the catalyst support.

10. The process of claim 5 wherein the amount of sodium silicate is such that after the sodium silicate solution has been in contact with the catalyst support for about 12 to 24 hours the pH of said solution is from about 7.5 to about 8.5.

11. The process of claim 3 wherein the palladium compound is present in an amount sufficient to provide about 1.5 to about 5.0 grams of palladium per liter of finished catalyst and is selected from the group consisting of palladium (II) chloride, sodium palladium (II) chloride, palladium (II) nitrate and palladium (II) sulfate and the gold compound is present in an amount sufficient to provide about 0.5 to about 2.25 grams of gold per liter of finished catalyst and is selected from the group consisting of auric (III) chloride and tetrachloroauric (III) acid.

12. The process of claim 9 wherein the palladium compound is sodium palladium (II) chloride that is present in an amount sufficient to provide about 1.65 to about 3.3 g. of palladium per liter of finished catalyst and the gold compound is tetrachloroauric (III) acid that is present in an amount sufficient to provide about 0.75 to about 1.5 g. of gold per liter of finished catalyst.

13. The process of claim 12 wherein the palladium and gold are deposited as an alloy in a surface layer of the catalyst support extending less than about 0.2 mm from the surface of said support.

14. A catalyst having a specific activity of at least about 83 grams of vinyl acetate per gram of precious metal per hour measured at 150° C. consisting essentially of
1. a catalyst support having a particle diameter of from about 3 to about 7 mm, and a pore volume of from about 0.2 to about 1.5 mlg, a 10% by weight water suspension of said support having a pH of from about 3.0 to about 9.0,
2. a palladium-gold alloy distributed in a surface layer of said support, said surface layer extending less than about 0.5 mm from the surface of said support, the palladium in said alloy being present in an amount of from about 1.5 to about 5.0 grams per liter of catalyst, the gold being present in an amount of from about 0.5 to about 2.25 grams per liter of catalyst and
3. from about 5 to about 60 grams per liter of catalyst of alkali metal acetate.

15. The catalyst of claim 14 wherein the catalyst support has an internal surface area of from about 10 to about 800 square meters per gram.

16. The catalyst of claim 15 wherein said palladium-gold alloy is distributed in a surface layer extending at most about 0.2 mm from the surface of the catalyst support.

17. The catalyst of claim 15 wherein the catalyst support has a pore volume of from about 0.5 to about 1.1 ml/g.

18. The catalyst of claim 17 wherein the palladium is present in an amount of from about 1.65 to about 3.3 grams per liter of catalyst and the gold is present in an amount of from about 0.75 to about 1.5 grams per liter of catalyst.

19. The catalyst of claim 18 wherein the catalyst support is silica containing at least about 90% $SiO_2$, said catalyst support having an internal surface area of from about 40 to about 400 square meters per gram.

* * * * *